(12) United States Patent
Berg

(10) Patent No.: US 8,353,141 B2
(45) Date of Patent: Jan. 15, 2013

(54) METHOD AND SERVICE FOR ASSEMBLING A MODULAR STRUCTURE SUCH AS A WIND POWER PLANT

(75) Inventor: Mario Berg, Altluβheim (DE)

(73) Assignee: Mario Berg, Altluβheim (DE)

( * ) Notice: Subject to any disclaimer, the term of this patent is extended or adjusted under 35 U.S.C. 154(b) by 729 days.

(21) Appl. No.: 12/436,790

(22) Filed: May 7, 2009

(65) Prior Publication Data

US 2009/0282776 A1 Nov. 19, 2009

(30) Foreign Application Priority Data

May 7, 2008 (DE) .......................... 10 2008 022 654

(51) Int. Cl.
*B66C 23/06* (2006.01)
*B66C 23/62* (2006.01)
*E04H 12/34* (2006.01)

(52) U.S. Cl. ........ 52/745.04; 52/745.2; 52/114; 52/121; 52/123.1

(58) Field of Classification Search ................... 52/40, 745.02–745.04, 745.17, 52/745.15, 745.19, 745.5, 111, 114, 117, 52/121, 123.1, 125.1, 125.2, 126.1, 126.3, 52/120; 414/12; 182/103
See application file for complete search history.

(56) References Cited

U.S. PATENT DOCUMENTS

| | | | | |
|---|---|---|---|---|
| 3,673,754 A * | 7/1972 | Murashige et al. | ........ | 52/745.17 |
| 3,789,565 A * | 2/1974 | Lindholm | .................. | 52/745.01 |
| 3,950,913 A * | 4/1976 | Mori | .............................. | 14/77.3 |
| 4,028,792 A * | 6/1977 | Tax et al. | ......................... | 29/431 |
| 4,696,135 A * | 9/1987 | Kallinger et al. | ............... | 52/121 |
| 5,490,364 A * | 2/1996 | Desai et al. | ..................... | 52/637 |
| 6,301,841 B1 * | 10/2001 | Rhebergen et al. | .......... | 52/123.1 |
| 6,357,549 B1 | 3/2002 | Brennan | | |
| 6,888,264 B1 * | 5/2005 | Willis et al. | ..................... | 290/55 |
| 7,207,777 B2 | 4/2007 | Bervang | | |
| 7,310,915 B2 * | 12/2007 | Olsen | .............................. | 52/111 |
| 7,442,009 B2 * | 10/2008 | Arel | .............................. | 416/142 |
| 8,011,098 B2 * | 9/2011 | Vorhies et al. | ............... | 29/889.2 |
| 2002/0084142 A1 * | 7/2002 | Brennan et al. | ............... | 182/133 |
| 2007/0000724 A1 * | 1/2007 | Anasis et al. | ................. | 182/141 |
| 2010/0293781 A1 * | 11/2010 | Foo et al. | ........................ | 29/791 |

FOREIGN PATENT DOCUMENTS

| | | |
|---|---|---|
| DE | 626 553 | 2/1936 |
| DE | 94 14 643 | 1/1995 |
| DE | 102 34 299 | 2/2004 |
| FR | 2 849 877 | 7/2004 |

* cited by examiner

*Primary Examiner* — Joshua J Michener
*Assistant Examiner* — Elizabeth A Plummer
(74) *Attorney, Agent, or Firm* — Paul Vincent

(57) ABSTRACT

A method and a device for assembling a structure that is formed from several modules that are disposed on top of each other, e.g. a wind power plant. An auxiliary mast of modular construction is erected parallel to and laterally of the structure to be erected, wherein the length of an auxiliary mast module approximately corresponds to the length of a structural module. A respective auxiliary mast module is previously detachably connected to a respective structural module to form an overall module, such that the auxiliary mast module can accept the weight of the structural module. The overall modules that are each formed from one auxiliary mast module and one structural module are moved by means of the lifting gondola in an upward direction along the auxiliary mast of previously erected structural modules to the level of the assembly position.

16 Claims, 10 Drawing Sheets

(a)　　　　　(b)　　　　　(c)

Fig.5
(a) 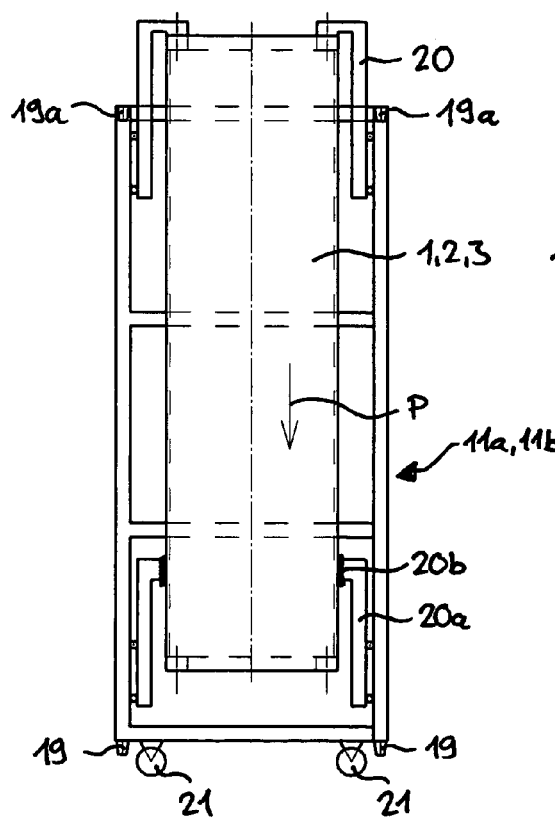
(b) 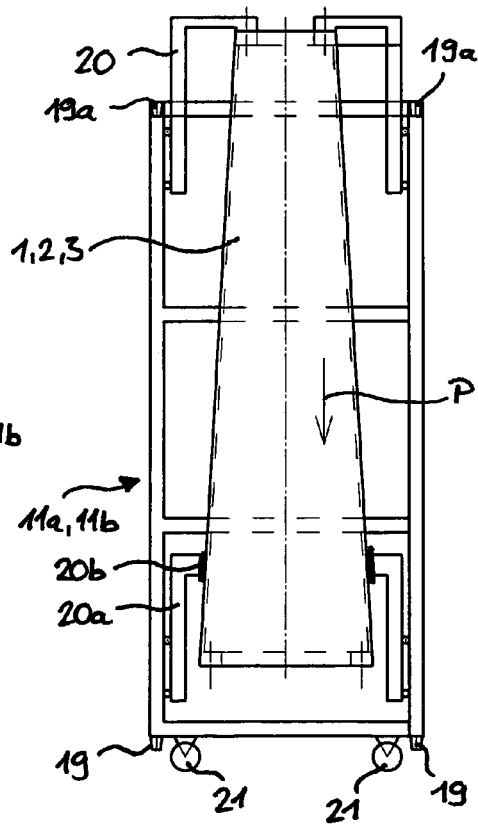

(a)　　　　　　(b)　　　　　　(c)

METHOD AND SERVICE FOR ASSEMBLING A MODULAR STRUCTURE SUCH AS A WIND POWER PLANT

BACKGROUND OF THE INVENTION

The invention concerns a method for assembling a structure that is formed from several modules that are disposed on top of each other, such as a wind power plant or the like, wherein a first module of the structure is initially erected and at least one further structural module is subsequently disposed onto the first structural module or the previously erected structural modules by lifting at least the at least one further structural module to the level of its assembly position by means of a lifting gondola in such a fashion that contact between the lifting gondola and the previously erected structural module(s) is prevented at least during movement of the lifting gondola. The invention also concerns a device, which is suited for performing such a method, for assembling a structure that is formed from several modules that are disposed on top of each other, such as a wind power plant or the like, with a lifting gondola that can be moved between a first position in which it can receive a structural module to be assembled, and a second position at the level of the assembly position of the structural module to be mounted on a previously erected structural module, wherein the lifting gondola is guided in such a fashion that contact between the lifting gondola and the previously erected structural module(s) is prevented at least during movement of the lifting gondola along the auxiliary mast.

There are many different conventional modular structures of the above-mentioned type, in particular, in the form of wind power plants and also in the form of TV/radio towers, bridges—or to be more precise: bridge piers, etc. In particular, wind power plants are becoming more and more important in view of decreasing fossil fuels. Consequently, their sizes and efficiency increase and the locations where they are erected should provide continuous wind power and be sparsely populated in order to be profitable and minimally affect the population. The increasing sizes and the fact that many locations are difficult to access, e.g. in particular at sea (so-called offshore plants), can cause considerable problems with respect to the assembly of such plants and also with respect to removal of the plant, if required. The same naturally also applies to structures of the above-mentioned type of similar size.

Wind power plants generally comprise a structure of several structural modules that are disposed on top of each other, which may be formed e.g. from welded steel tube, lattice girders or reinforced concrete elements. The ends of the structural modules may have corresponding mounting flanges for connection, which are generally provided on the inside of the hollow modules in order to facilitate access, e.g. via internal stairs or a ladder, for a technician who screws them in place, and also to provide an optically uniform overall impression. The structural modules themselves may either be cylindrical, in particular circular cylindrical, or conical, and taper towards the top. In both cases, the wall thickness may moreover decrease from module to module and/or within one module from the bottom to the top in order to reduce material. Modern wind power plants today have a height of up to approximately 120 m and an approximately equally sized rotor diameter, which obtains a power of up to approximately 5 MW. The length of the structural modules of such plants is often in a range of approximately 30 m, and having a structural module weight of approximately 150 t. The machine gondola, on which the rotor is disposed, may even have a weight of several 100 t.

In most cases, wind power plants of this type are presently assembled on site by means of cranes. In dependence on the location where the structural modules are erected, the structural modules are moved to their destination by means of special trucks or ships, where they are picked up by the assembly crane and lifted to their assembly position, whereby the assembly crane must hold them in position until they are completely fixed to each other, in particular, screwed and/or welded. For onshore assembly, extremely large mobile telescopic or lattice steel tower cranes are used, in which case the ground must be particularly levelled/compacted. For offshore assembly, special lifting ships are used, which have corresponding cranes and can be arranged at the sea bottom via supports that can be lowered such that the crane is arranged in a stationary fashion independently of the state of the sea.

It is obvious that the use of such cranes requires a considerable amount of time and cost, which includes the transport of the crane to and away from the site and its erection, which may e.g. require the use of counterweights for erecting its arm. In addition thereto, strong winds or overall unfavorable weather conditions often naturally prevail at the site of erection, which not only applies for erection of such structures in the offshore region. It may happen that the time for erecting a plant at a location that is favorable for operating a powerful wind power plant is actually limited to only a few months of the year due to the assembly preconditions. In contrast thereto, it usually takes some weeks to erect the plant, which may be considerably extended by unfavorable weather conditions requiring stoppage of any work. Finally, there is only a limited number world-wide of lifting devices for such wind power plants of continuously increasing size.

DE 103 08 239 A1 describes a method and a device for erecting a wind power plant that is formed from several structural modules that are disposed on top of each other, the top structural module of which bears the machine gondola with the rotor. The plant is erected by lifting each previously erected structural module to such an extent that the following structural module can be inserted below the lower one of the previously erected modules and can be fastened thereto. In consequence thereof, the previously finished overall structure must always be lifted to a suitable height in order to add further structural modules. The machine gondola of the wind power plant is thereby mounted to the initially erected structural module, in the present case, the upper module, already at the start with the consequence that it must always be lifted as well. The lifting means that is used for this purpose has corresponding complex dimensions and comprises linear guidances having the length of one respective structural module, which must also accept the wind forces that act during assembly. The most important disadvantage, however, is that also in this case, a crane is obligatory at least for disposing the machine gondola onto the first (upper) structural module, which entails the above-described problems.

EP 1 057 770 B1 discloses a method and a device of this type that are, in particular, also suited to erect an offshore wind power plant. Sections of a guiding rail are welded to each individual mast module of the wind power plant such that a lifting gondola that is driven along previously erected mast modules by means of a cable is guided on the guiding rails, thereby preventing contact between the lifting gondola and the mast to largely prevent damage thereof and also, in particular, of an anti-corrosion paint. Disadvantageously, considerable transverse forces and bending moments act on the guiding rails that are rigidly connected to the mast modules, during movement of the lifting gondola, which necessitates extremely expensive over-dimensioning of the mast modules, in particular, for relatively large masts that are required for offshore wind power plants in order to accept the additional stress that is generated during erection. The guiding rails themselves that are only used to erect the mast also produce considerable additional cost. It also takes a relatively great amount of time to erect such a mast since the mast modules that are transported on the lifting gondola in an upward direction along the guiding rails must initially be oriented with respect to the previously erected mast modules, and the mast module must then be screwed to the upper previously erected module prior to moving the lifting gondola again along the guiding rail of the last erected (upper) mast module.

It is the underlying purpose of the invention to further develop a method and a device of the above-mentioned type by means of a simple and inexpensive construction such that the above-mentioned disadvantages are at least largely eliminated.

SUMMARY OF THE INVENTION

With respect to the process, this object is achieved with a method of the above-mentioned type in that
  an auxiliary mast that also has a modular construction is erected parallel to and laterally of the structure to be erected, wherein the length of an auxiliary mast module approximately corresponds to the length of a structural module; wherein
  a respective auxiliary mast module is previously detachably connected to a respective structural module to form an overall module such that the auxiliary mast module can accept the weight of the structural module; and wherein
  the overall modules that are each formed from one auxiliary mast module and one structural module are moved by means of the lifting gondola in an upward direction along the auxiliary mast of previously erected structural modules to the level of the assembly position.

This object is also achieved in accordance with the invention with a device of the above-mentioned type by
  providing an auxiliary mast that also has a modular structure and can be arranged parallel to and laterally of the structure to be erected, wherein the length of an auxiliary mast module approximately corresponds to the length of a structural module; wherein
  a respective auxiliary mast module is detachably connected to a respective structural module to form an overall module, such that the auxiliary mast module can accept the weight of the structural module; and wherein
  the lifting gondola is guided on the auxiliary mast of the at least one previously erected structural module in order to move the overall modules that are each formed from one auxiliary mast module and one structural module in an upward direction to the level of the assembly position.

The dependent claims describe advantageous embodiments of the invention.

The inventive embodiment ensures that heavy loads in the form of structural modules can be lifted to a higher level by means of the lifting gondola that is guided on the auxiliary mast without the use of cranes, and be held at that location during assembly, wherein the dependence on weather influences, in particular wind, is considerably reduced compared to prior art. The self-supporting auxiliary mast modules do not only accept all the weight generated by the lifting gondola but, in particular, also transverse forces, bending moments and twisting forces, such that no additional load acts on the structural modules during erection thereof. In consequence thereof, over-dimensioning of the structural modules is not necessary, wherein the structural modules are reliably protected against any damage. Due to the fact that the lifting gondola is exclusively guided on the auxiliary mast, contact with previously erected structural modules is reliably prevented such that they cannot be damaged, i.e. neither the anti-corrosion paint provided thereon nor the modules themselves, e.g. through plastic deformation due to external mechanical action. At the same time, the weight, transverse and twisting forces as well as the bending moments of the (loaded) lifting gondola can practically be completely introduced into the structure of the auxiliary mast such that the structure itself need not be sufficiently high to accept additional forces, in particular torques, during assembly, which would occur if the lifting gondola were fixed in an arbitrary fashion directly to the previously erected structural modules or guiding rails thereof. The auxiliary mast modules can thereby be adjusted to any structural modules without requiring constructive changes to the latter. If desired, the inventive auxiliary mast can also be removed in a simple fashion when the structure has been erected, and be used again to erect similar structures, and optionally be mounted/removed again at a later time, e.g. when the machine gondola and/or the rotor blades of the plant must be replaced. Another advantage is that only the auxiliary mast modules must be fixed to each other in order to move the machine gondola along them whereas, in accordance with prior art, complete assembly of the structural modules themselves is required. This saves a great deal of time for erecting the structure, since e.g. the last erected (upper) structural module can be screwed while its auxiliary mast module can be passed by the lifting gondola in order to lift the following module to its assembly position. The auxiliary mast modules can finally also be used, in particular, as "transport containers" for the structural modules such that the overall modules that are each formed from one structural module and one auxiliary mast module can be moved to the location where they are erected, thereby reliably protecting the structural modules, and be moved to their assembly position by means of the lifting gondola.

Further features and advantages of the invention can be extracted from the following description of embodiments of the invention with reference to the drawings.

BRIEF DESCRIPTION OF THE DRAWING

FIG. 5 shows schematic views of overall modules each formed from a structural module and an auxiliary mast module;

DESCRIPTION OF THE PREFERRED EMBODIMENT

Figure 1:
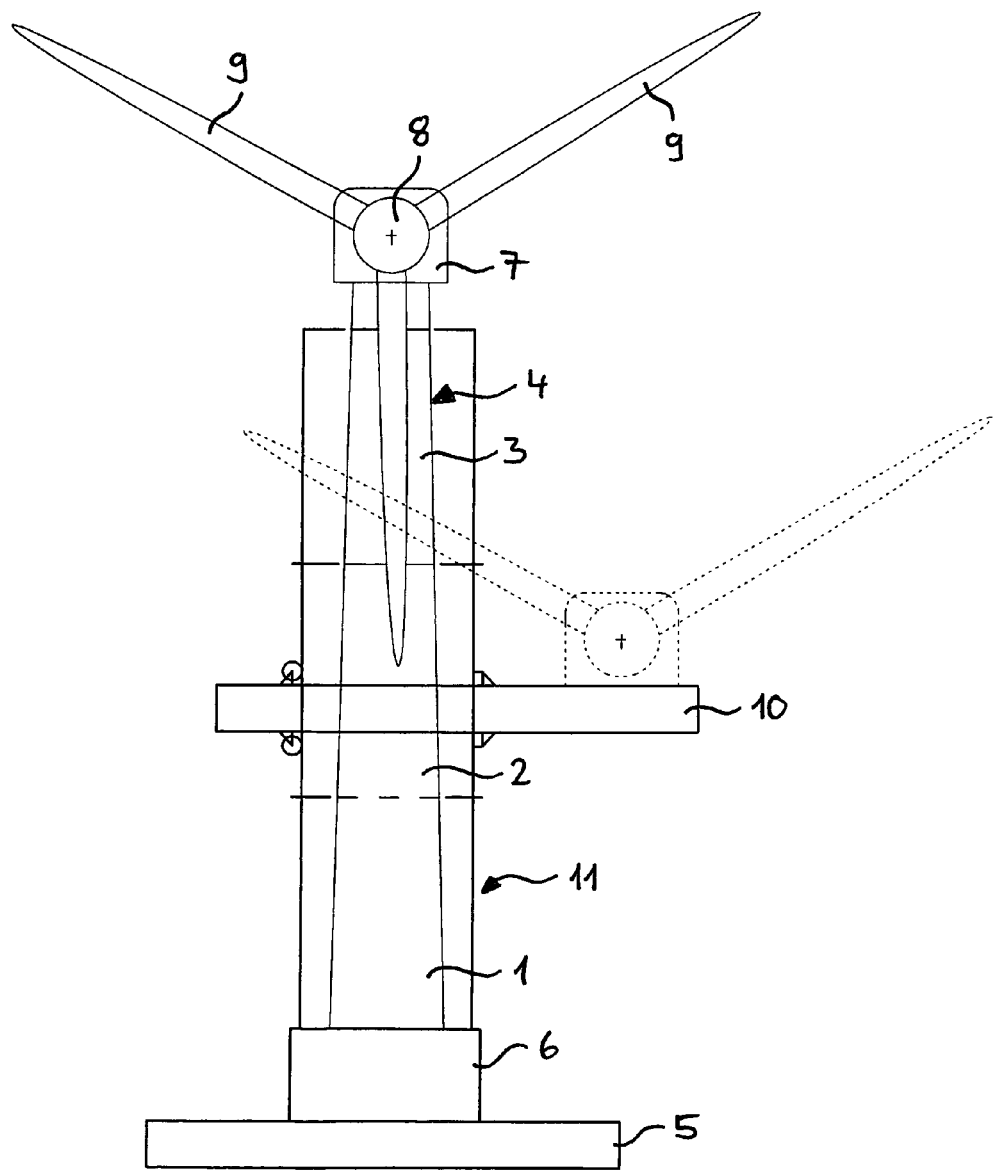
FIG. 1 shows a schematic view of an embodiment of a device for mounting a structure, which is formed from several modules that are disposed on top of each other, to such a structure in the form of a wind power plant.

FIG. 1 shows a structure 4 that is formed from several modules 1, 2, 3, in the present case three modules, which are disposed on top of each other, in the form of a wind power plant that is supported on a foundation structure 6 that is disposed on a foundation 5. The upper structural module 3 bears a machine gondola 7 of the wind power plant, on which a shaft 8 with e.g. three rotor blades 9 is rotatably disposed. The wind power plant may be an onshore or an offshore plant.

FIG. 1 also shows a device for assembling the structure 4, by means of which the latter has been erected. The device comprises a lifting gondola 10 that can be moved between a first position, in which it can receive a structural module to be mounted, in the present case the machine gondola with two rotor blades shown in dash-dotted lines (i.e. in the area of the lower section of the lower structural module 1), and a second position at the level of the assembly position of the structural module to be mounted (i.e. in the area of the upper section of the previously erected upper structural module 3). The lifting gondola 10 is thereby guided on an auxiliary mast 11 that is disposed on the side of the structure 4, such that, when the lifting gondola 10 is moved along the auxiliary mast 11, contact between the lifting gondola 10 and the structure 4 is prevented as well as introduction of normal, transverse and twisting forces, and also of bending moments into the structure 4, which are generated by the (loaded) lifting gondola 10 and the wind acting thereon, thereby preventing any mechanical damage to the structure 4.

Figure 2:
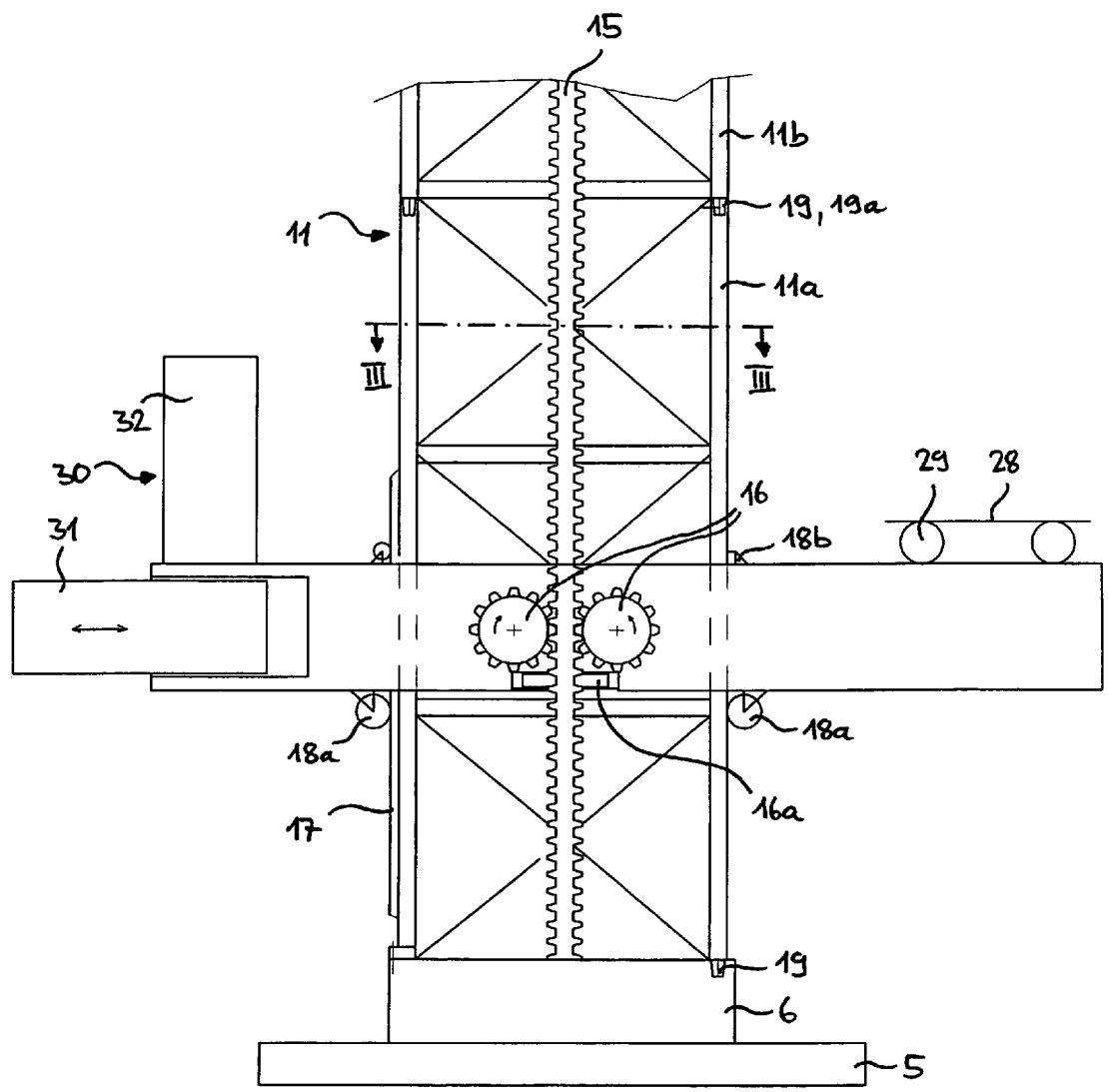
FIG. 2 shows a schematic detailed view of an embodiment of the guidance of the lifting gondola of the device in accordance with FIG. 1 on its auxiliary mast.
Figure 3:
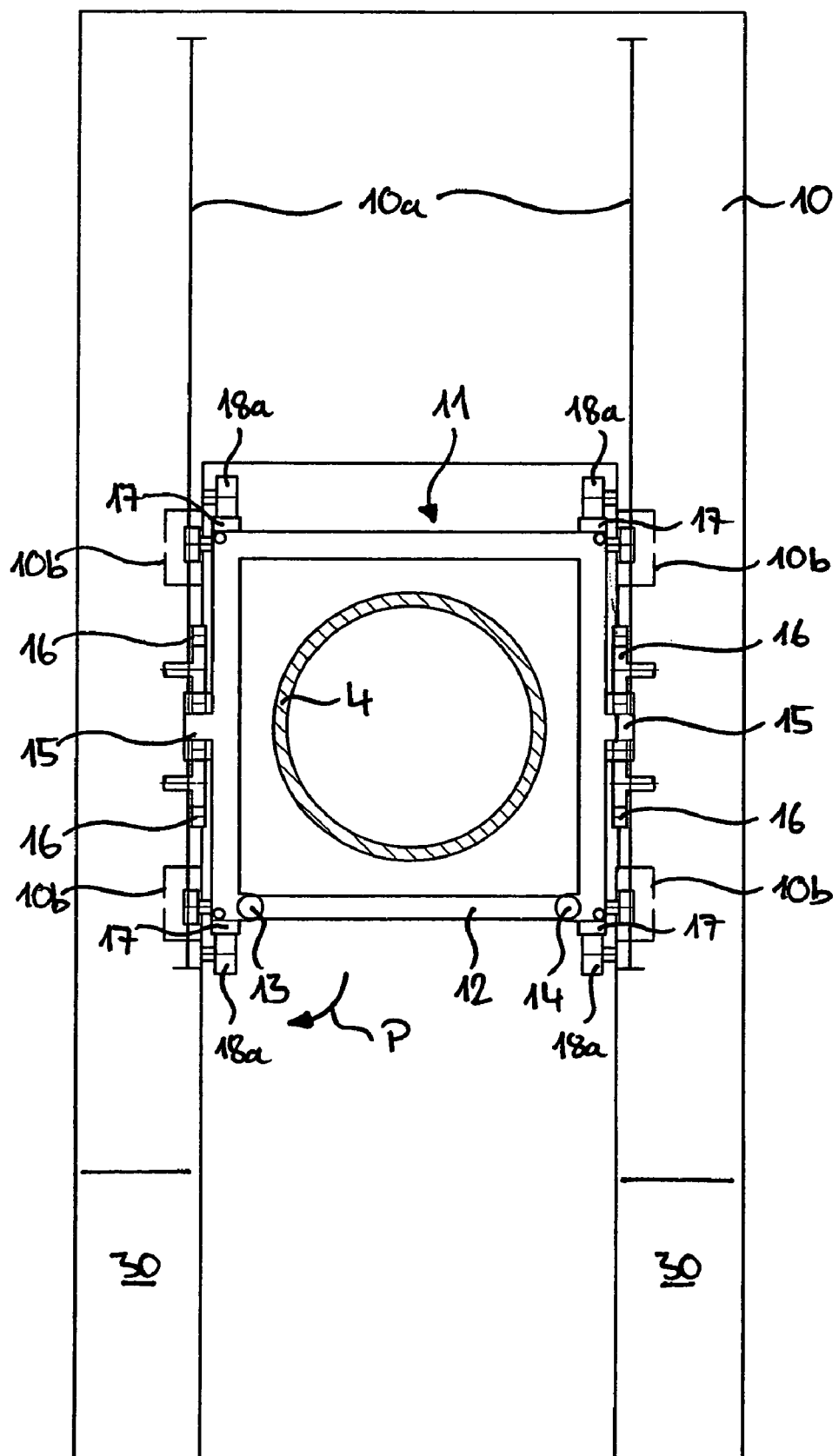
FIG. 3 shows a schematic cross-sectional view of the device in accordance with FIG. 2 along the line of intersection III-III in FIG. 2.

In particular FIG. 2, which does not show the structure 4 (FIG. 1) for reasons of clarity, and FIG. 3 show that the auxiliary mast 11 surrounds the structure substantially in the form of a U or V, which offers the possibility to construct the auxiliary mast 11 around the structure to be erected or around previously erected structural modules, thereby keeping a predetermined separation from the structure. In order to increase the stability, in particular, the strength and the rigidity of the auxiliary mast 11, the auxiliary mast 11 advantageously not only surrounds the structure substantially in the shape of a U or V, but the free ends of the U- or V-shaped structure can additionally be detachably connected to each other by means of reinforcing elements 12 (FIG. 3) such that the auxiliary mast 11 surrounds the structure 4 on all sides. The reinforcing elements 12 may e.g. by formed by approximately rod-shaped supports that are hinged to a bearing 13 at one end of the U-shaped structure such that they can be pivoted in the direction of the arrow P and can be detachably fixed to the other end of the U-shaped structure by means of closing elements 14. The U-shaped auxiliary mast 11 thereby forms a closed frame structure and can be opened, if required, e.g. for removing the auxiliary mast 11 when the structure is completed. The reinforcing elements 12 may, of course, also be detachably fixed to the ends of the U-shaped structure in a different fashion e.g. by screwing, positive fit or any other conventional joining method. FIG. 2 also shows, in particular, that the auxiliary mast can be formed like a bar construction.

Figure 4:
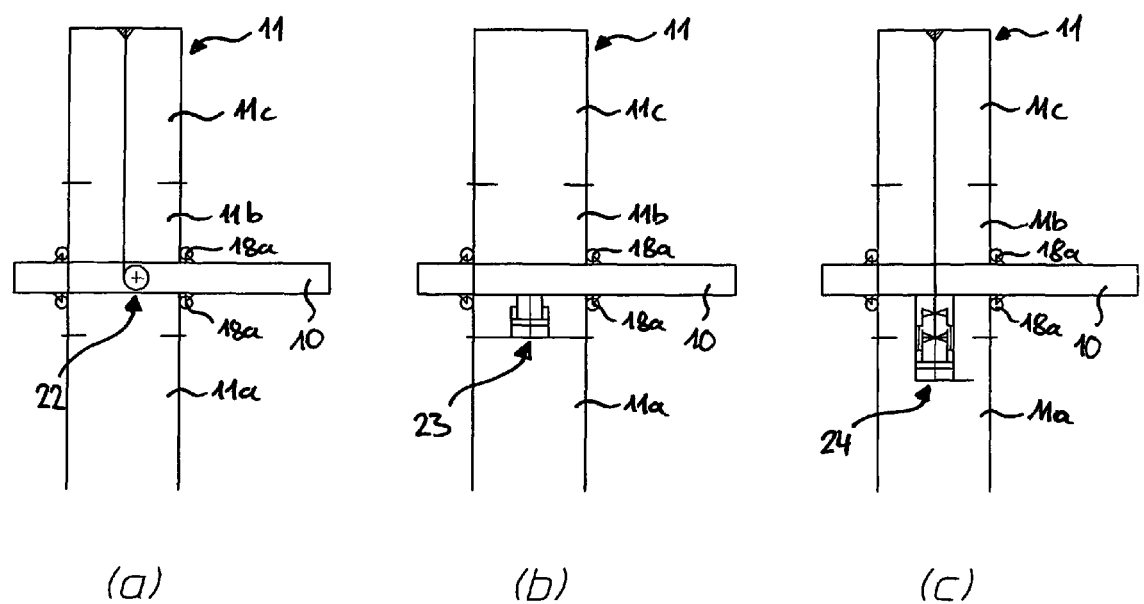
FIG. 4 shows schematic detailed views of alternative embodiments of the drive of the lifting gondola.

FIGS. 2 and 3 also show, in particular, that the drive of the lifting gondola 10 comprises e.g. at least one rack 15 that is disposed on the auxiliary mast 11, and also at least one toothed wheel 16 that is disposed on the lifting gondola 10, is driven by a motor, and engages the rack 15, wherein, in the present case, a pair of toothed wheels 16 engages in the teeth disposed on opposite sides of the rack 15, which is favorable in view of the force balance in order to counteract, in particular, the repulsive forces of the toothed wheels 16 away from the rack 15. Such a drive enables continuous or discontinuous or stepwise movement of the lifting gondola and stoppage thereof at any level. As an alternative or in addition to such a rack-and-pinion drive, other drives may naturally also be provided such as e.g. rope winches 22 (FIG. 4*a*), presses 23 (FIG. 4*b*), strand-jacks 24 (FIG. 4*c*) or the like.

In the present embodiment, guiding surfaces (indicated on the right-hand side in FIG. 2) or rails 17 (indicated on the left-hand side in FIG. 2 and also in FIG. 3) are moreover provided on at least two opposite outer sides of the auxiliary mast 11, which can accept the guiding forces of the lifting gondola 11 during its movement along the rack 15 through contact with guiding wheels 18*a* of the lifting gondola. A sliding contact between the lifting gondola 10 and the auxiliary mast 11 may alternatively or additionally be provided (indicated by reference numeral 18*b* on the right-hand upper side in FIG. 2).

FIG. 2 also shows that the auxiliary mast 11 as well as the structure 4 itself are also formed in a modular fashion, wherein the length of an auxiliary mast module 11*a*, 11*b* advantageously approximately corresponds to the length of a structural module 1, 2, 3. The embodiment of the rack 15 is thereby selected such that the toothing of the modules 11*a*, 11*b* exactly merges at the transition of two erected auxiliary mast modules 11*a*, 11*b*, in order to provide a harmonic transition and prevent any wear or even damage to the passing toothed wheels 16 of the lifting gondola 10 in the transition area. The modular construction of the auxiliary mast 11 is particularly important in that a respective auxiliary mast module 11*a*, 11*b* can be detachably connected to a respective structural module to form an overall module, such that the auxiliary mast module 11*a*, 11*b* can accept the weight of the structural module and also any transverse and twisting forces as well as bending moments that are generated, in particular, also by the lifting gondola 10.

The overall module consequently forms a static unit and permits simultaneous use of the auxiliary mast modules 11*a*, 11*b* as "transport containers" for the structural modules that protect them from external damage already during transport, e.g. on special trucks or ships. The structural modules 1, 2, 3 can also be easily stored and erected in such an overall module and assume a stable position in the vertical orientation. Moreover, the structural modules of the overall modules can already be arranged on the lifting gondola 10 in a suitable relative position with respect to the previously erected part of the structure 4 when the lifting gondola is located in its lower position such that, when the lifting gondola 10 has been moved in an upward direction to the level of the assembly position, the overall modules require no further adjustment.

In accordance with an advantageous embodiment of the invention, the individual auxiliary modules 11*a*, 11*b* are aligned at their mutually facing ends during erection, i.e. together with the structural modules that are detachably fixed thereto, e.g. by means of interlocking elements 19, 19*a* provided at the front ends, wherein the interlocking elements 19, 19*a* may comprise e.g. conical pins 19 that can be inserted into complementary receptacles 19*a*. In particular, FIGS. 2, 5, 7 and 10 show that the auxiliary mast modules 11*a*, 11*b*, 11*c* of the overall modules consequently have interlocking elements 19, 19a that are preferably disposed at the front ends in order to align them with the upper previously erected auxiliary mast module 11a, 11b, 11c during erecting thereof, wherein aligned interlocking elements 19, 19a of neighboring auxiliary mast modules 11a, 11b, 11c can be associated, in particular, with a quick release fastener for mounting them to each other. A quick release fastener provided for securing such a connection may be designed e.g. in the form of securing bolts (not shown) which can be inserted into aligned bores that extend in a transverse direction, i.e. substantially radially, both in the pins 19 and also in the receptacles 19a of the interlocking elements to form a quick release fastener for simple and quick handling, by means of which the auxiliary mast modules can be mounted to each other in order to subsequently also connect the corresponding structural modules 1, 2, 3 to each other, e.g. by screwing. In the present embodiment, interlocking elements in the form of conical pins 19 are disposed at the lower ends of the auxiliary mast modules 11a, 11b, 11c, wherein the complementary receptacles 19a are disposed at the upper ends of the auxiliary mast modules 11a, 11b, 11c. This design is also advantageous in that the structural modules 1, 2, 3 that are supported in each case by the auxiliary mast modules 11a, 11b, 11c are automatically disposed in the correct relative position with respect to the upper previously erected structural module after fixing the auxiliary mast modules 11a, 11b, 11c to each other, such that e.g. the hole patterns, which are usually arranged in terminal flanges for screwing the structural modules 1, 2, 3 to each other, are aligned with each other and do not require any further relative mutual adjustment. Instead of securing bolts of a quick release fastener of the above-mentioned type, other securing means are naturally also feasible, e.g. hooks, which are pivotably mounted to one of two neighboring auxiliary mast modules 11a, 11b, 11c and can be brought into engagement on a pin of the other auxiliary mast module 11a, 11b, 11c.

In one particularly advantageous embodiment of such overall modules that are formed from structural module 1, 2, 3 (FIG. 1) and auxiliary mast module 11a, 11b (FIG. 2), the structural module 1, 2, 3 is disposed in the overall module such that it can be moved in height with respect to the auxiliary mast module 11a, 11b, wherein the structural module 1, 2, 3 is disposed at a higher level than the auxiliary mast module 11a, 11b during transport, and can be lowered at least to the level of the auxiliary mast module 1, 2, 3. Embodiments of such overall modules are shown in FIG. 5, wherein the modules in accordance with FIGS. 5a and 5b only differ in that the structural module 1, 2, 3 in accordance with FIG. 5a is approximately circular cylindrical, while the structural module 1, 2, 3 in correspondence with FIG. 1 is conically shaped in FIG. 5b. In accordance with the invention, the structural module can naturally have any shape without having to change the design of the device for erecting the structure. Only the geometrical dimensions of the detachable fixation of the structural modules 1, 2, 3 must be adjusted to the auxiliary mast modules 11a, 11b. In the present case, the height adjustability of the structural module 1, 2, 3 with respect to the auxiliary mast module 11a, 11b is ensured by grippers 20 of the auxiliary mast modules 11a, 11b, which are adjusted to the geometry of the respective structural modules 1, 2, 3, and are disposed on the frame structure of the auxiliary mast module such that they can be adjusted in height, e.g. linearly, along the frame structure by means of rollers, piston/cylinder units or the like (arrow P). FIG. 5 also shows that the grippers 20 can e.g. be used to suspend the structural module 1, 2, 3 in the auxiliary mast module 11a, 11b, 11c of a respective overall module, wherein, in the present embodiment, they engage e.g. in a hole pattern, provided for mounting the structural modules 1, 2, 3 to each other, of an upper inner flange (not shown in detail in FIG. 5) of the structural module 1, 2, 3, which serves at the same time for mounting the structural modules 1, 2, 3 to each other, thereby forming the structure to be erected. In the area of the lower end, the auxiliary mast modules 11a, 11b, 11c may also be provided with lateral guiding elements 20a that are suitably coated with a resilient material 20b, e.g. rubber or soft plastic material, on their side facing the structural module 1, 2, 3 in order to keep the structural module 1, 2, 3 in its position within the overall module without damaging it in case it contacts the guiding elements 20a. In this fashion, a structural module to be erected that has been moved to its assembly position can be lowered onto the upper previously erected structural module after the auxiliary mast modules of the respective overall modules have been fixed to each other. Rolls or rollers 21 may also be provided on the lower side of the auxiliary mast modules 11a, 11b in order to facilitate lateral movement of the modules, which may be guided by rails. Lateral displacement on sliding rails is naturally basically also possible.

Figure 6:
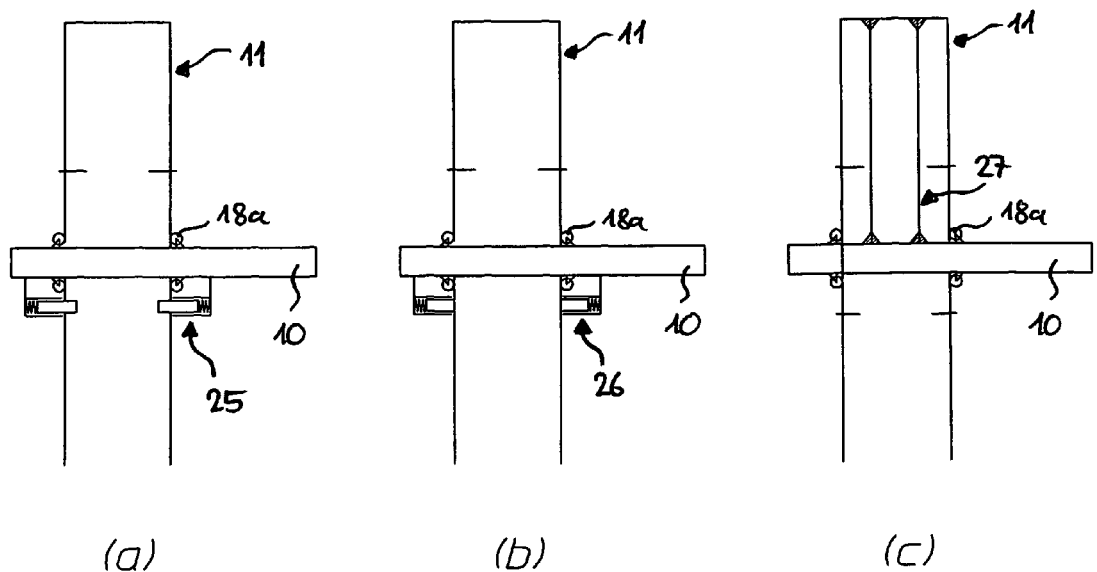
FIG. 6 shows schematic views of embodiments of a blocking element of the lifting gondola on the auxiliary mast.

In a further advantageous embodiment, the drive of the lifting gondola 10 may have blocking elements that are designed to fix the lifting gondola 10 to the auxiliary mast 11. The blocking elements are used, in particular, as securing elements since they can block the lifting gondola 10 preferably in practically any position on the auxiliary mast. The blocking elements may e.g. positively engage in the rack 15 of the rack-and-pinion drive shown in FIG. 2, and e.g. be pre-loaded into their blocking position by means of springs. Blocking elements of this type are indicated by reference numeral 16a in FIG. 2. These blocking elements are also advantageous in that, when the lifting gondola 10 has been fixed at a desired level by means of the blocking elements, the drive, i.e. in the case of the rack-and-pinion drive of FIG. 2, the toothed wheels 16, is no longer loaded and the weight of the lifting gondola 10 and the structural modules 1, 2, 3 transported thereon, is accepted by the blocking elements. FIG. 6 shows further embodiments of such blocking elements 25, 26, 27, which may be used both for supporting the lifting gondola 10 at a desired level and also for securing the lifting gondola 10 in case of failure of the drive. FIG. 6a shows that the blocking elements 25 may e.g. be supporting elements that are pre-loaded in the direction of the blocking position, such as bolts, which are disposed on the lifting gondola 10 and/or the auxiliary mast 11, and engage with positive fit in corresponding receiving structures of the auxiliary mast 11 and/or the lifting gondola 10 (FIG. 6a), or the blocking elements 26 are formed as similar supporting elements, e.g. bolts, that are pre-loaded in the direction of the blocking position and are, in turn, disposed on the lifting gondola 10 and/or the auxiliary mast 11 but can only be fixed by friction to corresponding structures of the auxiliary mast 11 and/or the lifting gondola 10, such as e.g. a sliding joint (FIG. 6b), wherein the blocking elements 26 are also preferably self-locking. FIG. 6c shows a further embodiment of blocking elements 27 in the form of ropes, which are fixed to the upper end of the auxiliary mast 11 and hold the lifting gondola 10 in the respective position.

In a preferred embodiment in accordance, in particular, also with FIG. 2, which is provided, in particular, for erecting a wind power plant, the lifting gondola 10 has a shifting means 28 which can be moved between a lateral transport position (not shown in FIG. 2) formed from structural module 1, 2, 3 and auxiliary mast module 11a, 11b, 11c, and a slightly more central assembly position of the overall module substantially parallel to the plane of extension of the lifting gondola 10. The shifting means 28, which can move, in particular, the machine gondola 7 (FIG. 1) of the wind power plant into its assembly position and/or, if necessary, also moves the respective structural module 1, 2, 3 to be erected to the level of its assembly position during its transfer (e.g. when the auxiliary mast modules 11a, 11b, 11c do not have any rolling or shifting means on their lower side) may e.g. be designed like a carriage that is guided on roller bearings 29 or sliding bearings along the plane of extension of the lifting gondola 10 and e.g. be driven hydraulically, pneumatically or by a motor. In an advantageous alternative embodiment, the lifting gondola 10 may have guidances 10a on its surface (FIG. 2) e.g. in the form of rails, along which the overall modules that are formed from auxiliary mast modules 11a, 11b, 11c and structural modules 1, 2, 3, can be guided e.g. by means of rollers 21 (FIG. 5), sliding contact or the like, for transferring the overall modules from their lateral transport position, relative to the auxiliary mast 11, on the lifting gondola 10 into their assembly position. FIG. 3 also shows that these guidances 10a for the auxiliary mast modules 11a, 11b, 11c of the overall modules may be interrupted in some regions of the auxiliary mast 11 depending on the design of the guidances or the drive of the lifting gondola 10 in order to ensure permanent unobstructed movement of the lifting gondola 10 along the auxiliary mast 11, wherein in this case, separate guiding pieces 10b may be provided, which can be inserted into such gaps and can be mounted at the respective assembly level when the lifting gondola 10 has stopped, thereby completing the guidances 10a.

In this connection, in one further advantageous embodiment, the lifting gondola 10 may have a torque compensation system 30 that is designed to compensate for the torque exerted by the weight of a transported overall module (or also the machine gondola 7 of a wind power plant) in dependence on its position on the lifting gondola 10. In this fashion, the torque exerted by the overall module onto the lifting gondola 10 can be compensated for, in particular, when the overall module is transferred from its transport position on the lifting gondola 10 into its assembly position (which may advantageously be realized by the shifting means 28 as mentioned above). The torque compensation system 30 can e.g. comprise at least one counterweight 31 that is guided on the lifting gondola 10 (FIG. 2) and can be moved in the transverse or radial direction with respect to the auxiliary mast 11, wherein it may e.g. also be guided on sliding or roller bearings and be driven hydraulically, pneumatically or by a motor. The torque compensation system 30 may alternatively or additionally have e.g. a counterweight 32 that is disposed on the lifting gondola (also shown in FIG. 2), the weight of which can be changed. The counterweight 32 can thereby be formed e.g. by a tank, e.g. a water tank, which can be emptied partially or completely, as required, by means of a control valve (not shown), such that e.g. when the shifting means 28 is transported with a structural element 1, 2, 3 in a radial inward direction, the water tank can be correspondingly emptied.

Moreover, the lifting gondola 10 itself advantageously has an approximately U-shaped design (FIG. 3), wherein, in particular, in case of a torque compensation system 30 of the above-mentioned type, the free ends of this U-shape radially project with respect to the auxiliary mast 11, i.e. project past the outer contour of the auxiliary mast 11 in order to provide an adequate lever arm of the counterweights 31 and/or 32.

Figure 7:
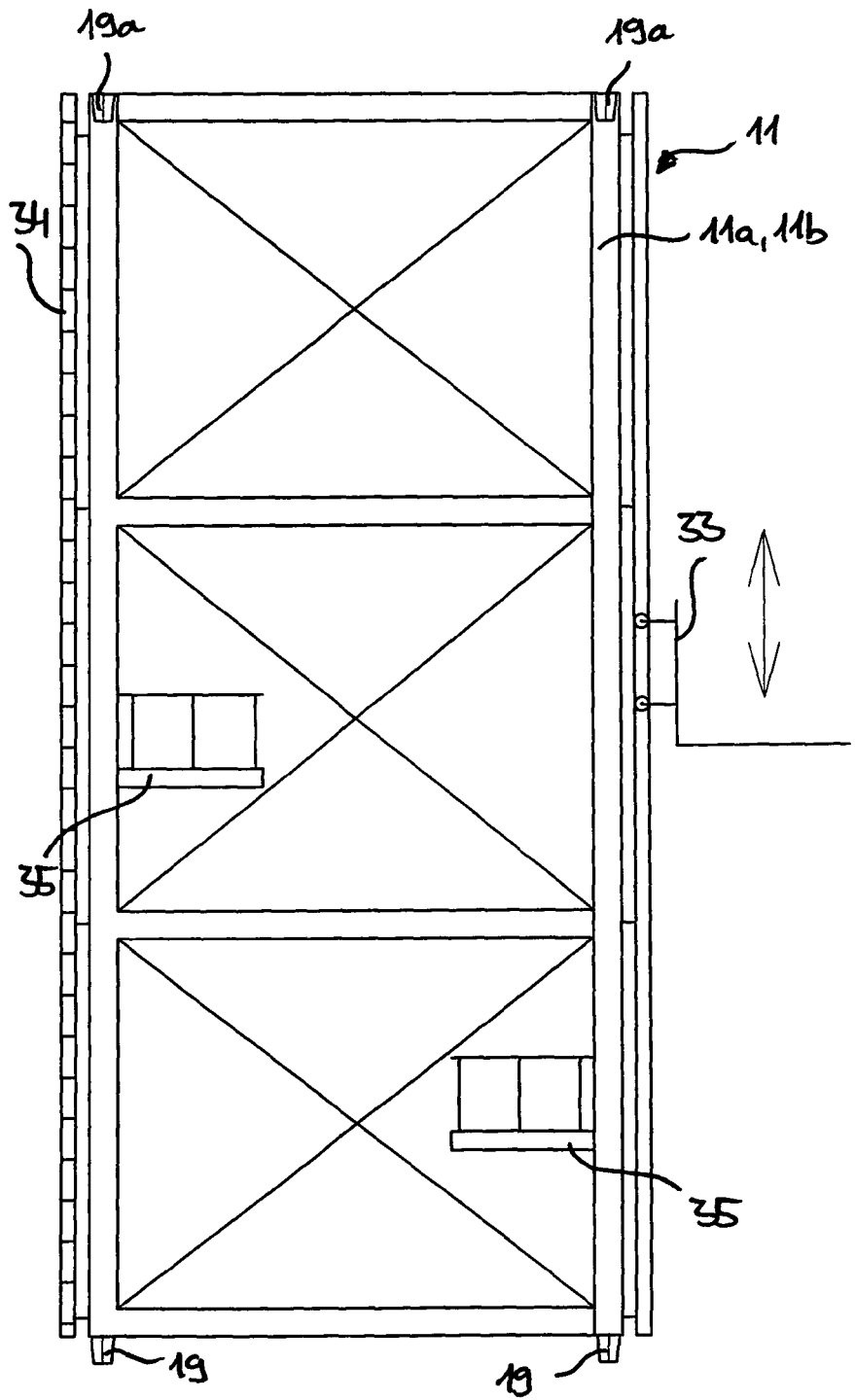
FIG. 7 shows a schematic view of an auxiliary mast module with further means that are suited, in particular, for maintenance and repair works on the structure.

FIG. 7 shows that the auxiliary mast 11 or the respective auxiliary mast module 11a, 11b may naturally also be used for mounting further means e.g. at least one further lifting means 33, such as a freight and/or passenger elevator that is guided on the auxiliary mast 11, an accessible staircase 34, accessible platforms 35 etc.

Figure 10:
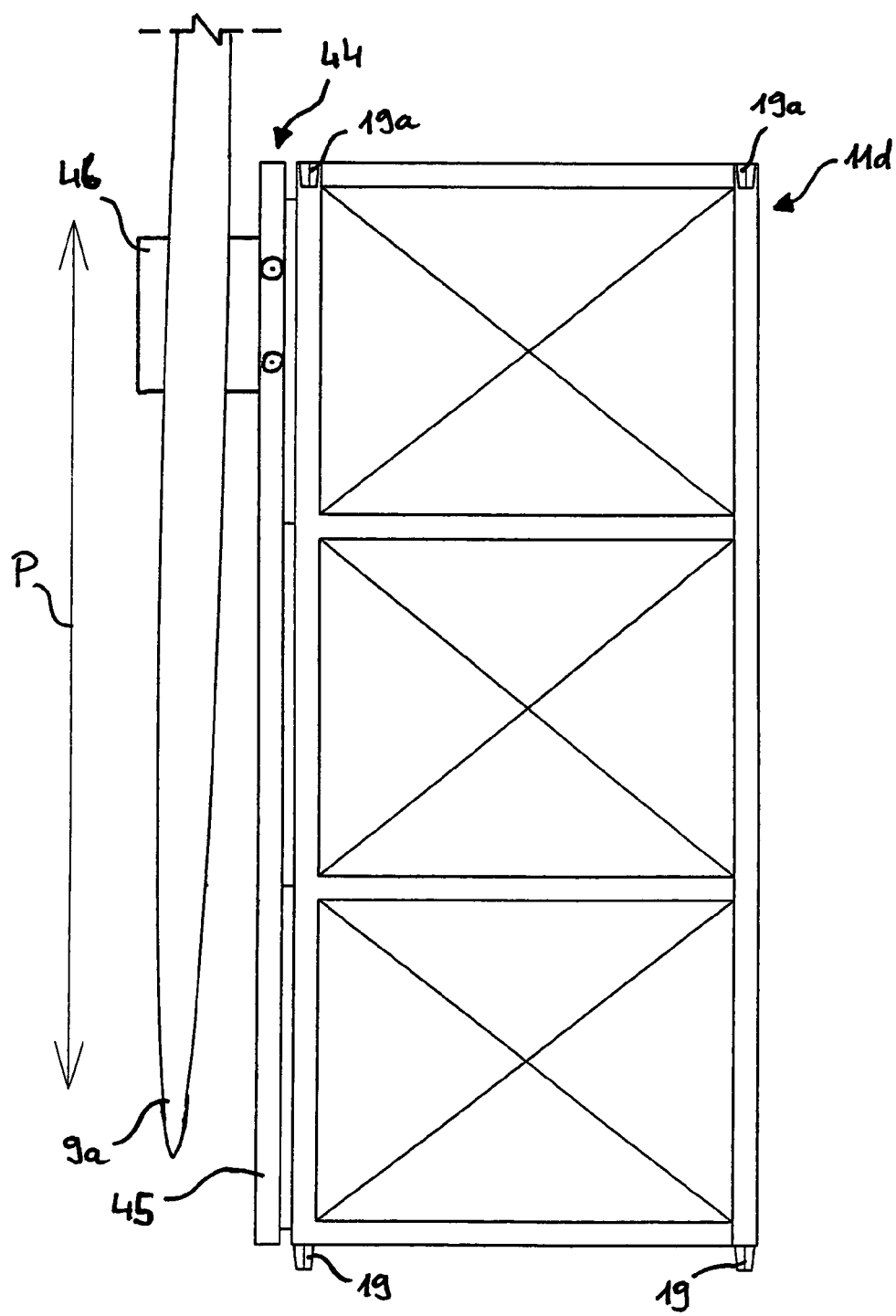
FIG. 10 shows a schematic view of an auxiliary mast module with a separate lifting means for holding and vertically displacing a rotor blade of the wind power plant.

FIG. 10 finally shows an auxiliary mast module 11d that can also bear a structural module (not shown), in particular the upper structural module, in correspondence with the embodiments in accordance with FIG. 5, and has a separate lifting means 44 that is designed to receive a rotor blade 9a of the wind power plant. The lifting means 44 thereby comprises a carriage 46 that can be displaced along a vertical guidance 45 on an outer side of the auxiliary mast module 11d in the direction of the arrow P, to which carriage the rotor blade 9a is detachably mounted. The guidance 45 is thereby disposed on that side of the auxiliary mast module 11d that is located between the free ends of the U-shaped lifting gondola 10 (see FIG. 3). This facilitates assembly of the third rotor blade 9a of the wind power plant, as is described in more detail below with reference to the inventive method, which is generally problematic, in particular, with respect to its positioning for fixing to the shaft 8 of the machine gondola 7 (see FIG. 1).

Figure 8:
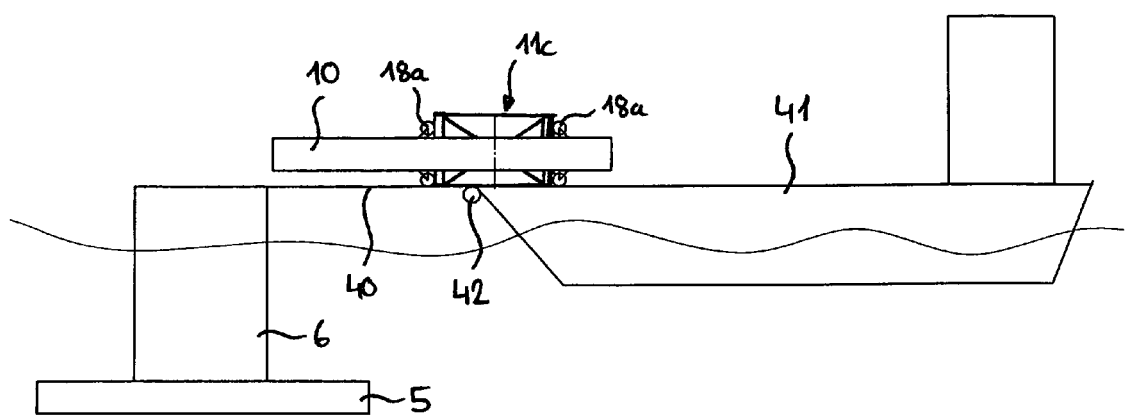
FIG. 8 shows a schematic view that illustrates the arrangement of the lifting gondola on the foundation of a structure to be erected.

The structure 4 can be mounted by means of the inventive device as described below:

As is sketched in FIG. 8, the foundation 5 of the structure and, if necessary, the foundation structure 6 disposed thereon, is/are initially established, which may be realized onshore or offshore (shown in FIG. 8). In order to facilitate arrangement of the auxiliary mast 11 with the lifting gondola 10, an auxiliary mast element 11c corresponding to the auxiliary mast elements 11a, 11b, but having a smaller height which is just sufficient to receive the lifting gondola 10, may initially and advantageously be disposed to surround the foundation structure 6 of the structure to be erected in the shape of a U, which may be realized e.g. by a ramp 40 that is hinged to a transport vehicle, in the present case a ship 41, such that it can be pivoted about a horizontal axis 42. The free U-shaped ends of the auxiliary mast element 11c are then connected to each other in correspondence with the situation shown in FIG. 3. The overall modules formed in each case by a structural module 1, 2, 3 and an auxiliary mast module 11a, 11b (see e.g. FIG. 5) are then successively delivered, and disposed onto the lifting gondola 10. The lifting gondola 10 is then moved upwardly along previously erected auxiliary mast modules 11a, 11b to the level of its assembly position and then moved to its final assembly position on the respectively upper previously erected structural module by means of the shifting means 28, where the overall modules are fixed. During final mounting of the structural modules 1, 2, 3, i.e. in particular while the structural modules 1, 2, 3 that have been previously brought into the assembly position are being secured by means of a quick release fastener comprising a securing bolt and/or hook of the above-mentioned type, the lifting gondola 10 can already be moved back into its lower position in which it can receive the next structural module.

Figure 9:
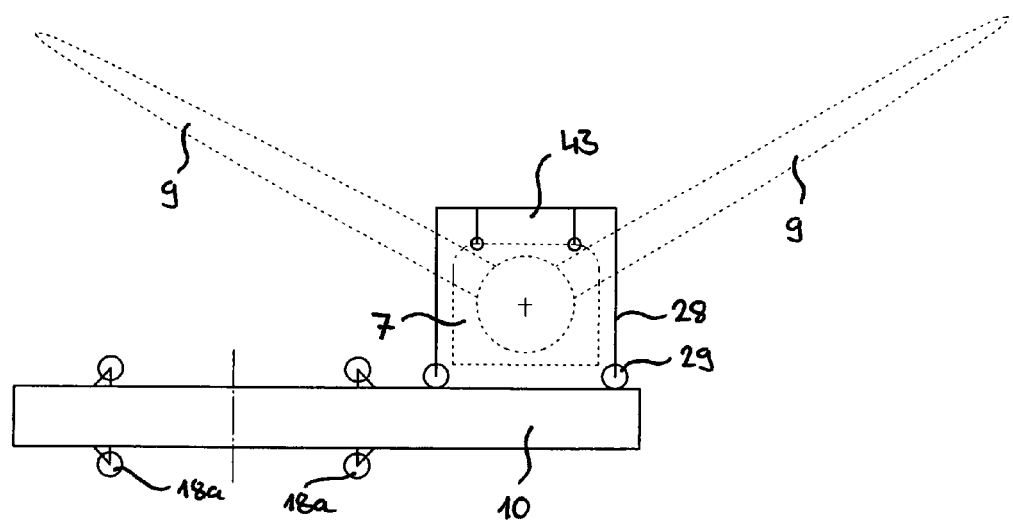
FIG. 9 shows a schematic view of the lifting gondola which bears the machine gondola, to be mounted, of a wind power plant.

FIG. 9 shows that in case of a wind power plant to be erected, the machine gondola 7 can finally be lifted to its assembly level by means of the lifting gondola 10 and then be moved along the supporting plane of the lifting gondola 10, e.g. on its carriage 28 that has rollers 29 and bears a holding frame 43 of the machine gondola 7 in FIG. 9, to its assembly position, wherein it is e.g. possible to previously mount two rotor blades 9 of the wind power plant to the machine gondola 7 and mount the machine gondola 7 with the two rotor blades 9 to the upper structural module 3 (FIG. 1).

If an auxiliary mast module 11d corresponding to the embodiment shown in FIG. 10 is used as auxiliary mast module of the upper overall module, the third rotor blade 9a can subsequently be easily mounted to the shaft of the previously mounted machine gondola 7. Towards this end, the carriage 46 that bears the third rotor blade 9a is moved upwardly to the desired assembly level in the direction of the arrow P in FIG. 10, the third rotor blade 9b is mounted to the shaft 8 of the machine gondola 7 and detached from the carriage 46. On the occasion of previous mounting of the machine gondola 7 itself, the rotor blade 9a that has previously been fixed to the lifting means 44 of the upper auxiliary mast module 11d can moreover be moved downwardly in the direction of the arrow P in FIG. 10 at least to such a level that the end of the rotor blade 9a on the mounting side (broken-off in FIG. 10) no longer substantially projects in an upward direction past the upper side of the auxiliary mast module 11d in order not to affect assembly of the machine gondola 7.

The invention naturally also allows complete or partial removal of the wind power plant (e.g. to exchange the machine gondola and/or individual rotor blades). The auxiliary mast 11 can naturally also be removed again after erection of the structure by removing the individual auxiliary mast modules 11a, 11b from the top to the bottom, moving them in a downward direction along the still erected auxiliary mast modules 11a, 11b by means of the lifting gondola 10, and carting them away.

The invention is finally not limited to the application for erecting structures in the form of wind power plants but may naturally also be used to erect any structures which are formed from several modules that are disposed on top of each other.

I claim:

1. A method for assembling a structure formed from several structural modules disposed on top of each other or for assembling a wind power plant, wherein a first structural module of the structure is initially erected, and at least one further structural module is subsequently disposed onto the first structural module or onto a previously erected structural module by moving the at least one further structural module in an upward direction using a lifting gondola to a level of an assembly position thereof such that contact between the lifting gondola and the previously erected structural modules is avoided during movement of the lifting gondola, the method comprising the steps of:

a) preparing a plurality of self-supporting auxiliary mast modules for erection parallel to and laterally of the structure to be erected, each of the self-supporting auxiliary mast modules having a length which approximately corresponds to a length of a respective one of the structural modules;

b) detachably connecting each of the self-supporting auxiliary mast modules to each of the structural modules to form overall modules, each of the self-supporting auxiliary mast modules thereby being structured and dimensioned to accept a weight of the respective overall module; and c) sequentially lifting the overall modules, each formed from one of the plurality of self-supporting auxiliary mast modules and one of the structural modules, in an upward direction using the lifting gondola along a self-supporting auxiliary mast of previously erected auxiliary mast modules to a level of assembly position of the respective structural module; and d) repeating step c) until completion of assembly of all structural modules, wherein, during displacement of the lifting gondola along the self-supporting auxiliary mast, contact between the lifting gondola and the structure is avoided and an introduction, into the structure, of normal forces, transverse forces, twisting forces and bending moments generated by the loaded lifting gondola and by wind acting thereon is prevented, wherein each structural module has a height which can be adjusted relative to each respective auxiliary mast module, each structural module thereby being disposed at a higher level than each respective auxiliary mast module and can be lowered at least to a level of that respective auxiliary mast module.

2. The method of claim 1, wherein, after moving one of the overall modules to the level of the assembly position thereof, that overall module is supported on the lifting gondola and is displaced substantially parallel to a plane of extension thereof to an assembly position of the respective structural module above an upper, previously erected structural module.

3. The method of claim 2, wherein a torque of the lifting gondola is compensated for during lateral displacement of the overall modules on the lifting gondola.

4. The method of claim 3, wherein the torque is compensated for by displacing or changing a weight of a counterweight of the lifting gondola.

5. The method of claim 1, wherein the overall modules are aligned during erection by means of interlocking elements that are disposed at front ends of respective auxiliary mast modules, wherein mutually aligned interlocking elements of neighboring auxiliary mast modules are mounted to each other or are mounted to each other by means of a quick-release fastener.

6. The method of claim 1, wherein a machine gondola of a wind power plant is disposed onto an upper one of the structural modules by means of the lifting gondola and can be moved along the auxiliary mast, wherein at least one rotor blade of the wind power plant is disposed on a separate lifting means of one of the overall modules or one of the auxiliary mast modules and that overall or auxiliary mast module is moved together with the at least one rotor blade into an assembly position by means of the lifting gondola, whereupon the at least one rotor blade is positioned with respect to the machine gondola by means of the lifting means and fixed to a shaft thereof.

7. A method for assembling a structure formed from several structural modules disposed on top of each other or for assembling a wind power plant, wherein a first structural module of the structure is initially erected, and at least one further structural module is subsequently disposed onto the first structural module or onto a previously erected structural module by moving the at least one further structural module in an upward direction using a lifting gondola to a level an assembly position thereof such that contact between the lifting gondola and the previously erected structural modules is avoided during movement of the lifting gondola, the method comprising the steps of:

a) preparing a plurality of self-supporting auxiliary mast modules for erection parallel to and laterally of the structure to be erected, each of the self-supporting auxiliary mast modules having a length which approximately corresponds to a length of a respective one of the structural modules;

b) detachably connecting each of the self-supporting auxiliary mast modules to each of the structural modules to form overall modules, each of the self-supporting auxiliary mast modules thereby being structured and dimensioned to accept a weight of the respective overall module; and c) sequentially lifting the overall modules, each formed from one of the plurality of self-supporting auxiliary mast modules and one of the structural modules, in an upward direction using the lifting gondola along a self-supporting auxiliary mast of previously erected structural modules to a level of assembly position of the respective structural module; and d) repeating step c) until completion of assembly of all structural modules, wherein, during displacement of the lifting gondola along the self-supporting auxiliary mast, contact between the lifting gondola and the structure is avoided and an introduction, into the structure, of normal forces, transverse forces, twisting forces and bending moments generated by the loaded lifting gondola and by wind acting thereon is prevented, wherein the auxiliary mast is disposed about the structure and is U-shaped or V-shaped, the auxiliary mast being initially disposed to surround the structure, whereupon free ends of the U- or V-structure are detachably connected to each other by means of reinforcing elements such that the structure is surrounded on all sides by the auxiliary mast.

8. A device for assembling a structure formed from several structural modules disposed on top of each other or for assembling a wind power plant, wherein a first structural module of the structure is initially erected, and at least one further structural module is subsequently disposed onto the first structural module or onto a previously erected structural module by moving the at least one further structural module in an upward direction using a lifting gondola to a level of an assembly position thereof such that contact between the lifting gondola and the previously erected structural modules is avoided during movement of the lifting gondola, the device comprising:

a plurality of self-supporting auxiliary mast modules structured for erection parallel to and laterally of the structure to be erected, each of the self-supporting auxiliary mast modules having a length which approximately corresponds to a length of a respective one of the structural modules;

means for detachably connecting each of the self-supporting auxiliary mast modules to one of the structural modules to form overall modules, each of the self-supporting auxiliary mast modules thereby being structured and dimensioned to accept a weight of the respective overall module; and means for sequentially lifting the overall modules, each formed from one of the self-supporting auxiliary mast modules and one of the structural modules, in an upward direction using the lifting gondola along a self-supporting auxiliary mast of previously erected auxiliary mast modules to a level of assembly position of the respective structural module, wherein, during displacement of the lifting gondola along the self-supporting auxiliary mast, contact between the lifting gondola and the structure is avoided and an introduction, into the structure, of normal forces, transverse forces, twisting forces and bending moments generated by the loaded lifting gondola and by wind acting thereon is prevented, each structural module having a height which can be changed relative to each respective auxiliary mast module, wherein each structural module is disposed at a higher level than each respective auxiliary mast module and can be lowered at least to a level of that respective auxiliary mast module.

9. The device of claim 8, wherein the lifting gondola has a shifting means which can be moved between a lateral transport position of a respective one of the overall modules and a more central assembly position of the respective structural module, substantially parallel to a plane of extension of the lifting gondola.

10. The device of claim 8, wherein the lifting gondola has a torque compensation system that is designed to compensate for a torque exerted by a weight of a transported one of the overall modules in dependence on a position thereof on the lifting gondola.

11. The device of claim 10, wherein the torque compensation system comprises at least one counterweight that is disposed on the lifting gondola, that is displaceably guided on the lifting gondola or having a weight which can be changed.

12. The device of claim 8, wherein the plurality of auxiliary mast modules of the overall modules have interlocking elements that are disposed at front ends, in order to align them with an upper previously erected auxiliary mast module during erection.

13. The device of claim 12, wherein mutually aligned interlocking elements of neighboring auxiliary mast modules are associated with a quick release fastener for fixing them to each other.

14. The device of claim 8, wherein a drive of the lifting gondola comprises at least one rack that is disposed on the auxiliary mast and at least one toothed wheel that is disposed on the lifting gondola and engages in the at least one rack.

15. The device of claim 8, wherein at least one of the overall or auxiliary mast modules has a separate lifting means which is designed to receive at least one rotor blade of a wind power plant.

16. A device for assembling a structure formed from several structural modules disposed on top of each other or for assembling a wind power plant, wherein a first structural module of the structure is initially erected, and at least one further structural module is subsequently disposed onto the first structural module or onto a previously erected structural module by moving the at least one further structural module in an upward direction using a lifting gondola to a level of an assembly position thereof such that contact between the lifting gondola and the previously erected structural modules is avoided during movement of the lifting gondola, the device comprising:

a plurality of self-supporting auxiliary mast modules structured for erection parallel to and laterally of the structure to be erected, each of the self-supporting auxiliary mast modules having a length which approximately corresponds to a length of a respective one of the structural modules;

means for detachably connecting each of the self-supporting auxiliary mast modules to each of the structural modules to form overall modules, each of the self-supporting auxiliary mast modules thereby being structured and dimensioned to accept a weight of the respective overall module; and means for sequentially lifting the overall modules, each formed from one of the self-supporting auxiliary mast modules and one of the structural modules, in an upward direction using the lifting gondola along a self-supporting auxiliary mast of previously erected auxiliary mast modules to a level of assembly position of the respective structural module, wherein, during displacement of the lifting gondola along the self-supporting auxiliary mast, contact between the lifting gondola and the structure is avoided and an introduction, into the structure, of normal forces, transverse forces, twisting forces and bending moments generated by the loaded lifting gondola and by wind acting thereon is prevented, wherein the auxiliary mast surrounds the structure substantially in a U-shape or V-shape and free ends of the U- or V-shaped structure can be detachably connected to each other by means of reinforcing elements such that the structure is surrounded on all sides by the auxiliary mast.

* * * * *